United States Patent [19]

Mysels et al.

[11] 4,150,094
[45] Apr. 17, 1979

[54] METHOD OF REACTING $I_2$ WITH A LIQUID AND A GAS

[75] Inventors: Karol J. Mysels; John H. Norman, both of La Jolla, Calif.

[73] Assignee: General Atomic Company, San Diego, Calif.

[21] Appl. No.: 865,949

[22] Filed: Dec. 30, 1977

[51] Int. Cl.² ........................ C01B 7/13; C01B 17/74
[52] U.S. Cl. .................................. 423/481; 423/522; 423/659
[58] Field of Search ............... 423/481, 486, 522, 244, 423/659, 242

[56] References Cited

U.S. PATENT DOCUMENTS

| | | | |
|---|---|---|---|
| 1,332,581 | 3/1920 | Tobler | 423/486 |
| 2,143,222 | 1/1939 | Heath | 423/481 |
| 2,871,098 | 1/1959 | Redniss et al. | 423/486 |
| 3,174,828 | 3/1965 | Hein | 423/486 |
| 3,318,662 | 5/1967 | Pauling | 423/242 |
| 4,089,940 | 5/1978 | Norman et al. | 423/522 |

Primary Examiner—Brian Hearn
Attorney, Agent, or Firm—Fitch, Even & Tabin

[57] ABSTRACT

A continuous reaction is carried out between gaseous $SO_2$, $I_2$ and liquid $H_2O$ in a substantially vertical reaction zone. $H_2O$ plus $I_2$ in a substantial excess are supplied to an upper location at preselected rates. $SO_2$ is injected into the zone at a lower location, and a desired temperature is maintained at an intermediate location where the reaction proceeds to produce sulfuric acid and hydrogen iodide. The reaction products are removed from a location near the bottom at a rate proportional to the preselected rates to cause a continuous downward flow within the reaction zone. The $SO_2$ flow rate assures that substantially all of the $SO_2$ either reacts or is absorbed by the downward traveling nongaseous reactants.

10 Claims, 2 Drawing Figures

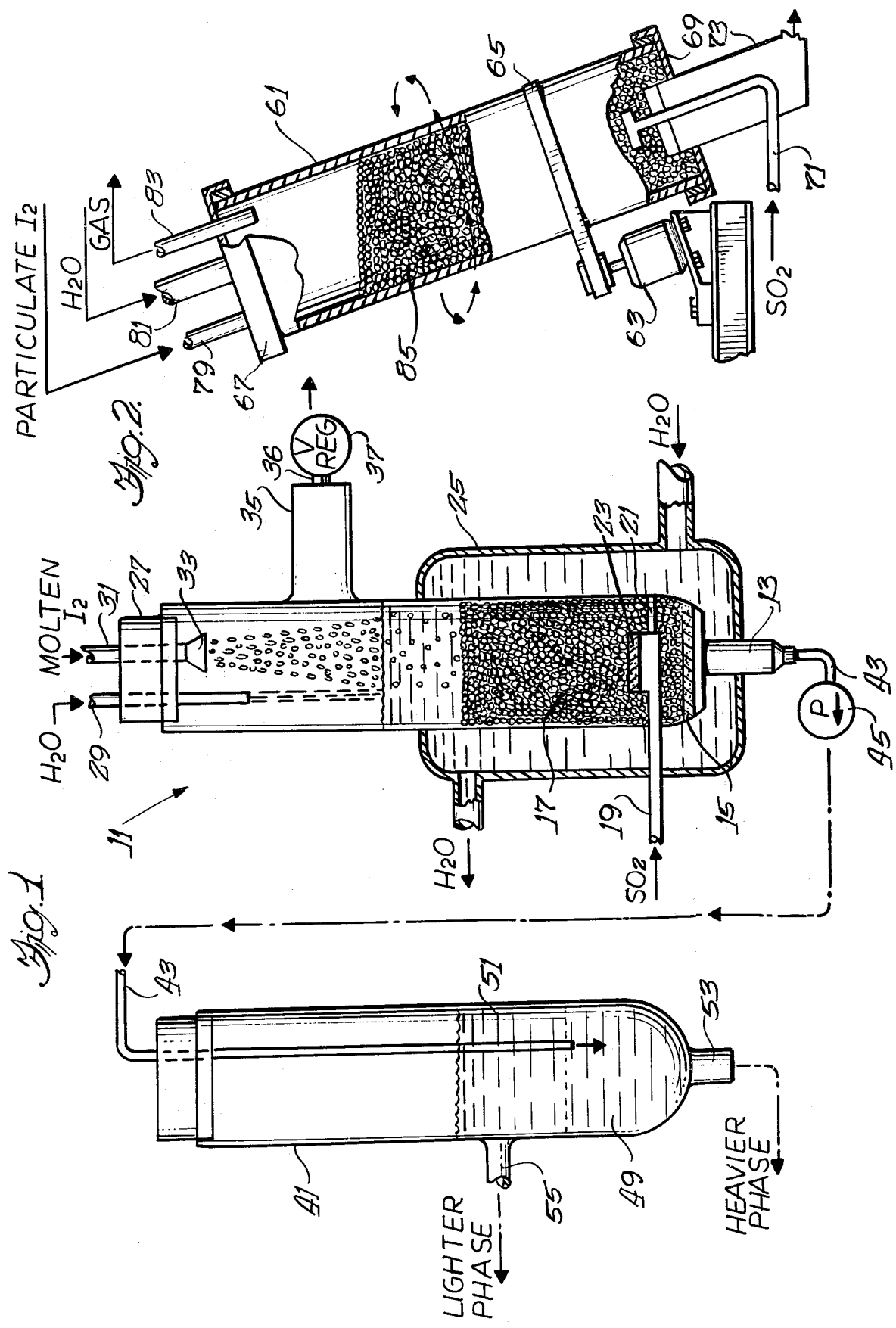

METHOD OF REACTING I$_2$ WITH A LIQUID AND A GAS

This invention relates to a method of continuously reacting a gas, a liquid and a solid, and more particularly to a method for continuously carrying out a reaction with solid iodine.

Iodine reacts with water and sulfur dioxide in accordance with the Bunsen reaction, which is defined by the equilibrium equation: $2H_2O+SO_2+I_2\rightleftarrows H_2SO_4+2HI$. The reaction has long been known and has been proposed for use in the recovery of iodine in U.S. Pat. No. 2,143,222, issued Jan. 10, 1939. The use of the reaction as a main step in a process for the thermochemical production of hydrogen is described in detail in U.S. patent application Ser. No. 786,009, filed Apr. 8, 1977, now U.S. Pat. No. 4,089,940 which is assigned to the assignee of this application. The present invention provides improvements in the continuous operation of the main reaction described in detail in the aforementioned copending patent application.

The present invention provides a process for continuously reacting iodine using a particulate bed of solid iodine. If the Bunsen reaction is being carried out, water is supplied at an upper location and gaseous SO$_2$ is supplied at a lower location. The Bunsen reaction readily proceeds in an intermediate zone, and the reaction products are withdrawn near the bottom. In accordance with the teaching of the aforementioned application, the reaction products separate into two layers of differing density. Other objects and advantages of the invention will be apparent from the following detailed description when read in conjunction with the appended drawings wherein:

FIG. 1 is a diagrammatic flow sheet showing a presently preferred arrangement for reacting iodine embodying various features of the invention, and FIG. 2 shows an alternative embodiment of a portion of the apparatus illustrated in FIG. 1.

It was earlier found that by carrying out the Bunsen reaction in the presence of an excess of both sulfur dioxide and iodine, relative to the amount of water available to take part in the reaction, a two-phase reaction system is created which is susceptible to liquid-liquid separation. The more dense or heavier phase contains a major fraction of the excess SO$_2$ and I$_2$ reactants, plus the major portion of the hydrogen iodide that is produced. Most of the hydrogen iodide is present in the form of HI$_3$ and higher polyiodides, such as HI$_5$ and HI$_7$, which contribute to the distinct phase separation. The lighter phase contains nearly all of the H$_2$SO$_4$ and minor amounts of I$_2$, SO$_2$ and H$_2$O. Normally, water serves not only as one of the reactants in the Bunsen reaction but also as at least a part of the medium wherein the reaction occurs, and both phases contain water. In general, although dependent somewhat upon the temperature, up to about 10 percent of the water which is present can take part in the reaction, regardless of the amount of excess of SO$_2$ and I$_2$, with the remainder of the water fulfilling its function as a solvent component.

The reaction may be carried out at room temperature (i.e., about 21° C.) and atmospheric pressure; however, reduced temperatures, e.g., down as low as about −60° C., as well as higher temperatures may be used. Because the present invention contemplates the employment of a particulate bed of solid iodine, operation somewhat below the melting point of iodine (114° C.) is contemplated.

Gaseous SO$_2$ is supplied by bubbling it into the reaction vessel at a lower location. The reaction is preferably carried out with SO$_2$ present in saturation conditions, and this is excellently achieved by the countercurrent flow arrangement where bubbles of SO$_2$ flow upwardly through a packed bed of iodine and through the water which moves downward through the reaction zone. The reaction products are denser than water and can be withdrawn from the bottom of the reaction vessel. Sulfur dioxide is supplied at a rate so that it saturates the reaction mixture and drives the Bunsen reaction to the right; however, the rate should not be such that SO$_2$ bubbles out the top of the vessel. Accordingly, the flow rate is adjusted so that all of the initially unreacting SO$_2$ is absorbed in the descending water above the reaction zone which contributes to maintaining the saturation conditions.

FIG. 1 diagrammatically illustrates apparatus for carrying out the continuous process which includes a vertical reaction vessel 11 made of a suitable material that is resistant to hydriodic acid, e.g., a quartz or glass-lined vessel or one made of a suitably chemically-resistive metal alloy. An exit line 13 connects to the bottom of the reaction vessel 11, and a porous support 15 fused from extra coarse glass frit separates the exit from the remainder of the reaction vessel and provides a base upon which a packed bed 17 of solid iodine is supported.

At a location just above the porous support 15, a gas inlet tube 19 enters through the side of the reaction vessel 11 and is supported by a spider 21 or several struts so that it terminates centrally within the vessel. The gas inlet tube 19 terminates in an upwardly facing diffuser 23 which is fused from a coarse glass frit. A suitable SO$_2$ pressure is maintained to prevent the entry of liquid thereinto, and SO$_2$ bubbles upward therethrough.

Because the Bunsen reaction is exothermic, a water jacket 25 is preferably provided so as to remove the heat of the reaction and maintain a desired temperature in the intermediate zone where the chemical reaction takes place. A top cap 27 to the reaction vessel contains a water supply inlet 29 and a line 31 through which molten iodine flows, at the desired flow rates. The molten iodine is pumped through the line 31 and through a spray head 33 in which it terminates, and the droplets of iodine crystallize when they enter the water and sink to the upper level of the packed bed 17. A side outlet 35 provides a gas exit at a level vertically above the water level and connects to a line 36 that contains a pressure-regulating valve 37. The valve 37 may be employed to control the pressure within the reaction zone. In the thermochemical production of hydrogen, the sulfuric acid reaction product will be decomposed and result in a mixture of SO$_2$ and O$_2$. The present method is excellently suited to inject this mixture through the inlet tube 19. The SO$_2$ will react, but the oxygen will pass through unaffected because it is nonreactive in this system. By controlling the rate of supply of the gas mixture, substantially pure O$_2$ will exit through the line 36.

As earlier indicated, the particulate bed 17 of solid iodine is built up in the reaction vessel 11 and then water is added to a predetermined level below the side outlet 35. As the flow of sulfur dioxide gas through the diffuser 23 is begun, the reaction proceeds as the bubbles work their way upward in the packed bed of iodine crystals which is submerged in water. The reaction products which are formed, namely, sulfuric acid and hydrogen iodides, mostly in the polyiodide form, and more dense than the water and tend to collect at the bottom of the reaction vessel. The density of the reaction products is less than solid iodine, and the reaction products are appropriately withdrawn through the extra coarse porous support 15 upon which the packed bed of iodine rests. As the bed of particulate iodine begins to decrease in size due to the chemical reaction, replacement iodine is added through the upper supply line 31. Water is also added at a rate proportional to the rate at which the reaction products are withdrawn so as to maintain the same water level within the reaction vessel 11.

Because the iodine is heavier than water, it crystallizes and sinks to the level of the particulate bed so that the uppermost layer in the reaction zone is water with some dissolved $I_2$. As steady-state conditions are approached, a lower zone exists generally adjacent the diffuser 23 where the reaction is substantially complete and through which the $SO_2$ simply bubbles because saturation in $SO_2$ is essentially complete. Above this an intermediate zone exists where the reaction is taking place, and when substantially pure $SO_2$ is used, there is a generally quiescent upper zone above the intermediate zone where the final dissolution of the now small $SO_2$ bubbles occurs. This quiescent zone extends upward to the surface of the water. When a mixture of $SO_2$ and a nonreactive gas, e.g., $O_2$, is injected, the smaller bubbles of $O_2$ will pass through the upper zone on their way to the exit 35.

The reaction is carried out under conditions which produce a two-phase system, and the phase separation is exemplified in a separatory vessel 41 into which the reaction products are withdrawn. Tubing 43 connected to the bottom outlet 13 below the porous support enters the top of the separatory vessel 41 and preferably extends downward to a lower location therein. The rate of withdrawal can be regulated either by varying the pressure difference between the vessels or by placing an adjustable valve (not shown) in the withdrawal line 43. A pump 45 is preferably installed in the line 43, or vacuum pump (not shown) may be connected to the vessel 41. As illustrated diagrammatically, the reaction products form a heavier phase 49 containing most of the polyiodides and a lighter phase 51 containing most of the sulfuric acid. Withdrawal of these two liquid phases is carried out at desired rates through two separate withdrawal conduits 53,55 provided respectively at the bottom and at a higher level in the separatory vessel 41.

As an example of operation under satisfactory conditions, after an initial bed of particulate iodine is provided and submerged in water, operation is begun at atmospheric pressure by bubbling sulfur dioxide through the diffuser 23 at a rate of about 2 liters per minute. Water is continuously added at a rate of about 30 grams per minute and iodine is added at a rate of about 200 grams per minute, both through the upper supply lines. The reaction products are withdrawn through the bottom outlet 13 at a rate of about 240 grams per minute and removed to the separatory vessel 41 where phase separation occurs. The flow of cooling water through the jacket 25 is regulated such that the temperature in the reaction zone is about 95° C. Examination shows that the sulfur dioxide bubbles are nearly totally absorbed within the intermediate reaction zone, and their dissolution is complete in the lower portion of the quiescent zone.

An alternative embodiment of the reaction apparatus is depicted in FIG. 2 wherein a cylindrical reaction vessel 61 is oriented at a slight angle to the vertical, and drive means, for example an electric motor 63 and a drive belt 65, is provided for slowly rotating the inclined vessel 61. In this arrangement, a supply cap 67 at the top and a bottom closure plate 69 are stationary, and suitable seals are provided between the rotating vessel 61 and these stationary components. An $SO_2$ inlet tube 71 is concentric with a bottom outlet 73 and extends upward through the porous support 75 to a higher level where it terminates in a diffuser 77. An iodine supply tube 79 and a water supply tube 81 enter through the top cap 67 in the manner previously described, except that particulate crystalline iodine is fed into the vessel 61. A gas outlet 83 is also provided in the top cap.

In such a rotating reaction vessel 61, only enough water may be used so that the packed bed of iodine 85 is kept wet, and it need not be totally submerged in water. The iodine crystals in the closely packed bed are kept moist with water, and the sulfur dioxide flows upward in the interstices between the wet particles. The stirring action which is effected by the rotating of the vessel 61 redistributes the moisture uniformly throughout the packed bed and prevents large channeling from occurring in local regions as a result of the reaction with iodine. The reaction takes place under similar conditions to those previously described with the excess of $SO_2$ and $I_2$ being even more pronounced. At steady state, the rates of addition and withdrawal are balanced so that the inventories of the reactants remain about the same.

In operation, three zones are distinguishable in the reaction vessel 61. In the top zone, little heating occurs, and any $SO_2$ which did not react below is absorbed in the water. In the intermediate zone, heat evolution occurs from the reaction, and this heat is preferably taken up by cooling water in an outer jacket (not shown). In the lowermost zone, the reaction is substantially complete and there is a saturation of $SO_2$ and iodine in the liquid. In operation, the uppermost zone may be kept as short as required to completely absorb the sulfur dioxide, and the lowermost zone need only be as long as required to complete the reaction without introducing undesirable aging effects. These same considerations apply to the reaction in the stationary vessel 11.

Although the invention has been described with regard to certain preferred embodiments, changes and modifications as would be obvious to one having the ordinary skill in the art may be made without departing from the scope of the invention which is defined solely by the claims appended hereto. Various of the features of the invention are set forth in the claims which follow.

What is claimed is:

1. A method of carrying out a continuous reaction between $SO_2$, $I_2$ and $H_2O$, which method comprises
providing a substantially vertical reaction zone,
supplying $H_2O$ in liquid form and $I_2$ to an upper location in said zone at preselected rates and under conditions to create a particulate bed of solid iodine plus liquid water,
injecting gaseous $SO_2$ into said zone at a lower location so that it travels upward in said zone, maintaining a desired temperature at an intermediate location in said zone where said reaction proceeds to produce sulfuric acid and hydrogen iodide, and removing the reaction products from a location near the bottom of said zone at a rate generally proportional to said preselected rates of supply to cause a continuous downward liquid flow within said reaction zone, said gaseous $SO_2$ being supplied at a flow rate proportional to said preselected rates so that substantially all of said $SO_2$ either reacts or is absorbed by the downward traveling liquid.

2. A method in accordance with claim 1 wherein $I_2$ is supplied at a rate of at least about 3 grams to each gram of water, wherein said removed reaction products form a lighter sulfuric acid-bearing phase and a heavier hydrogen iodide-bearing phase and wherein said phases are subsequently separated from each other.

3. A method in accordance with claim 1 wherein said reaction zone is provided by an inclined rotating tubular reaction vessel.

4. A method in accordance with claim 1 wherein $I_2$ is supplied a rate equal to at least about 5 grams per gram of $H_2O$ being supplied.

5. A method in accordance with claim 1 wherein said reaction zone includes an upper region consisting mainly of water through which $I_2$ settles upon being added.

6. A method in accordance with claim 5 wherein said $I_2$ is supplied as a dispersed liquid which solidifies to particulate form.

7. A method in accordance with claim 1 wherein $SO_2$ is supplied at a location vertically above said location where said reaction products are removed.

8. A method of carrying out a continuous chemical reaction between iodine, a reactant which is a gas and another reactant which is a liquid, which method comprises providing a substantially vertical reaction zone, providing a particulate bed of solid iodine in said zone, supplying said liquid reactant to an upper location in said zone at a preselected rate, injecting said gaseous reactant into said zone at a lower location, maintaining a desired temperature at an intermediate location in said zone where said chemical reaction with iodine proceeds resulting in liquid phase reaction products, removing said reaction products from a location near the bottom of said zone at a rate proportional to said preselected rate to cause a continuous downward flow within said reaction zone, said gas being supplied at a flow rate proportional to said preselected rate so that substantially all of said gas either reacts or is absorbed by the downward flowing liquid, and adding replacement solid iodine at a rate about equal to the rate at which said iodine chemically reacts within said zone.

9. A method in accordance with claim 8 wherein the density of said reaction products is greater than the density of said liquid and is less than the density of solid iodine.

10. A method of forming HI and $H_2SO_4$ by a chemical reaction between $SO_2$, $I_2$ and $H_2O$, which method comprises continuously supplying liquid $H_2O$ and molten $I_2$ to a reaction zone at a rate so that the rate of supply of $I_2$, by weight, is at least about 5 times that of water, and thereby maintaining a bed of particulate solid iodine plus liquid water in said zone, injecting gaseous $SO_2$ into a lower portion of said zone so that said $SO_2$ bubbles upward in said zone, maintaining a desired temperature in said zone where said chemical reaction proceeds to form HI and $H_2SO_4$ as reaction products, and removing said reaction products from a location below said point of $SO_2$ injection to cause a continuous downward flow of liquid within said reaction zone counter-current to said flow of $SO_2$.

* * * * *